(12) United States Patent  
Richardson

(10) Patent No.: US 9,078,284 B2  
(45) Date of Patent: Jul. 7, 2015

(54) PERSONAL ACCESS POINT MEDIA SERVER

(75) Inventor: Andrew Richardson, Cambridge (GB)

(73) Assignee: Airvana LP, Chelmsford, MA (US)

( * ) Notice: Subject to any disclaimer, the term of this patent is extended or adjusted under 35 U.S.C. 154(b) by 997 days.

(21) Appl. No.: 12/347,574

(22) Filed: Dec. 31, 2008

(65) Prior Publication Data

US 2010/0165960 A1    Jul. 1, 2010

(51) Int. Cl.
*H04W 88/08* (2009.01)
*H04W 76/02* (2009.01)

(52) U.S. Cl.
CPC .............. *H04W 88/08* (2013.01); *H04W 76/02* (2013.01)

(58) Field of Classification Search
CPC ........................... H04W 84/045; H04L 63/101
See application file for complete search history.

(56) References Cited

U.S. PATENT DOCUMENTS

| | | | |
|---|---|---|---|
| 6,711,144 B1 | 3/2004 | Kim et al. | |
| 6,731,618 B1 | 5/2004 | Chung et al. | |
| 6,741,862 B2 | 5/2004 | Chung et al. | |
| 6,781,999 B2 | 8/2004 | Eyuboglu et al. | |
| 7,170,871 B2 | 1/2007 | Eyuboglu et al. | |
| 7,200,391 B2 | 4/2007 | Chung et al. | |
| 7,242,958 B2 | 7/2007 | Chung et al. | |
| 7,277,446 B1 | 10/2007 | Abi-Nassif et al. | |
| 7,299,278 B2 | 11/2007 | Ch'ng | |
| 2002/0196749 A1 | 12/2002 | Eyuboglu et al. | |
| 2003/0100311 A1 | 5/2003 | Chung et al. | |
| 2005/0213555 A1 | 9/2005 | Eyuboglu et al. | |
| 2005/0239451 A1* | 10/2005 | Periyalwar et al. ........... 455/425 |
| 2005/0243749 A1 | 11/2005 | Mehrabanzad et al. | |
| 2005/0245279 A1 | 11/2005 | Mehrabanzad et al. | |
| 2006/0067422 A1 | 3/2006 | Chung | |
| 2006/0067451 A1 | 3/2006 | Pollman et al. | |
| 2006/0095339 A1* | 5/2006 | Hayashi et al. ................. 705/26 |
| 2006/0126509 A1 | 6/2006 | Abi-Nassif | |
| 2006/0159045 A1 | 7/2006 | Ananthaiyer et al. | |
| 2006/0240782 A1 | 10/2006 | Pollman et al. | |
| 2006/0291420 A1 | 12/2006 | Ng | |
| 2006/0294241 A1 | 12/2006 | Cherian et al. | |
| 2007/0026884 A1 | 2/2007 | Rao | |
| 2007/0058628 A1 | 3/2007 | Rao et al. | |
| 2007/0077948 A1 | 4/2007 | Sharma et al. | |
| 2007/0097916 A1 | 5/2007 | Eyuboglu et al. | |
| 2007/0115896 A1 | 5/2007 | To et al. | |
| 2007/0140172 A1 | 6/2007 | Garg et al. | |
| 2007/0140184 A1 | 6/2007 | Garg et al. | |
| 2007/0140185 A1 | 6/2007 | Garg et al. | |
| 2007/0140218 A1 | 6/2007 | Nair et al. | |
| 2007/0155329 A1 | 7/2007 | Mehrabanzad et al. | |
| 2007/0161402 A1* | 7/2007 | Ng et al. ..................... 455/554.2 |
| 2007/0165863 A1* | 7/2007 | Moosavi ........................ 380/283 |
| 2007/0220573 A1 | 9/2007 | Chiussi et al. | |
| 2007/0230419 A1 | 10/2007 | Raman et al. | |
| 2007/0238442 A1 | 10/2007 | Mate et al. | |

(Continued)

OTHER PUBLICATIONS

3rd Generation Partnership Project "3GPP2", "cdma2000 High Rate Packet Data Air Interface Specification", C.S0024, version 4.0, Oct. 25, 2002 (548 pages).

(Continued)

*Primary Examiner* — John Blanton
(74) *Attorney, Agent, or Firm* — Fish & Richardson P.C.

(57) ABSTRACT

In general, media data is stored in a storage medium of a mobile base station. The mobile base station transmits the media data from the mobile base station to a handheld device through a packet data protocol context.

33 Claims, 8 Drawing Sheets

(56) References Cited

U.S. PATENT DOCUMENTS

| | | | |
|---|---|---|---|
| 2007/0238476 A1 | 10/2007 | Raman et al. | |
| 2007/0242648 A1 | 10/2007 | Garg et al. | |
| 2007/0248042 A1 | 10/2007 | Harikumar et al. | |
| 2008/0003988 A1 | 1/2008 | Richardson | |
| 2008/0013488 A1 | 1/2008 | Garg et al. | |
| 2008/0062925 A1 | 3/2008 | Mate et al. | |
| 2008/0065752 A1 | 3/2008 | Ch'ng et al. | |
| 2008/0069020 A1 | 3/2008 | Richardson | |
| 2008/0069028 A1 | 3/2008 | Richardson | |
| 2008/0076398 A1 | 3/2008 | Mate et al. | |
| 2008/0100494 A1* | 5/2008 | Yamaura | 342/20 |
| 2008/0117842 A1 | 5/2008 | Rao | |
| 2008/0119172 A1 | 5/2008 | Rao et al. | |
| 2008/0120417 A1 | 5/2008 | Harikumar et al. | |
| 2008/0130770 A1* | 6/2008 | Khandekar et al. | 375/260 |
| 2008/0139203 A1 | 6/2008 | Ng et al. | |
| 2008/0146232 A1 | 6/2008 | Knisely | |
| 2008/0151843 A1 | 6/2008 | Valmikam et al. | |
| 2008/0159236 A1 | 7/2008 | Ch'ng et al. | |
| 2008/0162924 A1 | 7/2008 | Chinitz et al. | |
| 2008/0162926 A1 | 7/2008 | Xiong et al. | |
| 2008/0207200 A1* | 8/2008 | Fein et al. | 455/426.1 |
| 2008/0320094 A1* | 12/2008 | Tu et al. | 709/206 |
| 2009/0059848 A1* | 3/2009 | Khetawat et al. | 370/328 |
| 2009/0156213 A1* | 6/2009 | Spinelli et al. | 455/436 |
| 2010/0041358 A1* | 2/2010 | Wood | 455/226.3 |
| 2010/0048218 A1* | 2/2010 | Gale et al. | 455/450 |
| 2010/0056104 A1* | 3/2010 | Butler et al. | 455/410 |
| 2010/0165960 A1 | 7/2010 | Richardson | |
| 2010/0185753 A1* | 7/2010 | Liu et al. | 709/219 |
| 2011/0026510 A1* | 2/2011 | Matsumura et al. | 370/338 |
| 2011/0086654 A1* | 4/2011 | Larsson | 455/501 |

OTHER PUBLICATIONS

3rd Generation Partnership Project "3GPP2", "cdma2000 High Rate Packet Data Air Interface Specification", C.S0024-A, version 1.0, Mar. 2004 (1083 pages).

3rd Generation Partnership Project "3GPP2", "cdma2000 High Rate Data Air Interface Specification", C.S0024-A, version 2.0, Jul. 2005 (1227 pages).

3rd Generation Partnership Project "3GPP2", "cdma2000 High Rate Data Air Interface Specification", C.S0024-B, version 1.0, Apr. 2006 (1623 pages).

3rd Generation Partnership Project "3GPP2", "cdma2000 High Rate Data Air Interface Specification", C.S0024-B, version 2.0, Mar. 2007 (1627 pages).

Universal Mobile Telecommunications System (UMTS); Radio Resource Control (RRC); Protocol specification (3GPP TS 25.331 version 7.9.0 Release 7), Jul. 2008, 1473 pages.

Universal Mobile Telecommunications System (UMTS); User Equipment (UE) procedures in idle mode and procedures for cell reselection in connected mode (3GPP TS 25.304 version 7.6.0 Release 7), Jul. 2008, 43 pages.

Universal Mobile Telecommunications System (UMTS); Requirements for support of radio resource management (FDD)(3GPP TS 25.133 version 8.3.0 Release 8), Jun. 2008, 191 pages.

3rd Generation Partnership Project; Technical Specification Group Core Network and Terminals; Mobile radio interface Layer 3 specification; Core network protocols; Stage 3; 3GPP Technical Specification 24.008 version 7.9.0 (Release 7), Sep. 2007, 549 pages.

3rd Generation Partnership Project; Technical Specification Group Core Network and Terminals; Non-Access-Stratum (NAS) functions related to Mobile Station (MS) in idle mode (Release 7), 3GPP Technical Specification 23.122 version 7.9.0 (Release 7), Jun. 2007, 35 pages.

* cited by examiner

PERSONAL ACCESS POINT MEDIA SERVER

TECHNICAL FIELD

This patent application relates generally to a personal access point media server.

BACKGROUND

Wireless devices such as cellular telephones, laptops, and Personal Digital Assistants (PDAs) are ubiquitous in today's culture of wireless communications and networking. Cellular wireless communications systems are designed to serve multiple wireless-enabled devices distributed over a large geographic area by dividing the area into regions called "cells". At or near the center of each cell, a network-side access device (e.g., an access point) is located to serve client devices located in the cell and commonly referred to as "user equipments." A user equipment generally establishes a call, also referred to as a "communication session," with an access point to communicate with other entities (e.g., servers) in the network. Often the user equipments are mobile while the access points are stationary points of communication like cellular base stations. As wireless networking has moved into homes, businesses, vehicles, and other environments, local wireless access points have proliferated.

SUMMARY

In general, in some aspects, media data is stored in a storage medium of a mobile base station. The mobile base station transmits the media data from the mobile base station to a handheld device through a packet data protocol context.

Aspects can include one or more of the following features. The mobile base station establishes a first connection to a public data network, the first connection providing a data path for establishing a second connection between the mobile base station and a secure network. The handheld device registers with the public data network via the mobile base station and the secure network. Communications from the mobile base station to the public data network and communications from the mobile base station to the handheld device are transmitted at different times. A single transceiver transmits communications from both the mobile base station to the public data network and communications from the mobile base station to the handheld device. The mobile base station ceases transmission of the media data to the handheld device during paging periods from the public data network. The mobile base station reduces a rate of transmission of the media data to the handheld device if the mobile base station is positioned less than a predetermined distance away from a device having a predetermined broadcast strength. The mobile base station changes a frequency of transmission to the handheld device if the mobile base station remains positioned less than a predetermined distance away from a device having a predetermined broadcast strength for a predetermined length of time. The mobile base station is located on a vehicle. The media data stored on the storage medium is updated via WiFi, digital audio, or digital television broadcasts. Transmissions from the secure network to the mobile base station are controlled such that the mobile base station receives the transmissions at a known time prior to a paging time for the handheld device.

The details of one or more embodiments are set forth in the accompanying drawings and the description below. Other features and advantages will be apparent from the description and drawings, and from the claims.

DESCRIPTION OF DRAWINGS

This document describes these and other aspects in detail with reference to the following drawings.

Like reference symbols in the various drawings indicate like elements.

DETAILED DESCRIPTION OF ILLUSTRATIVE EMBODIMENTS

Figure 1:
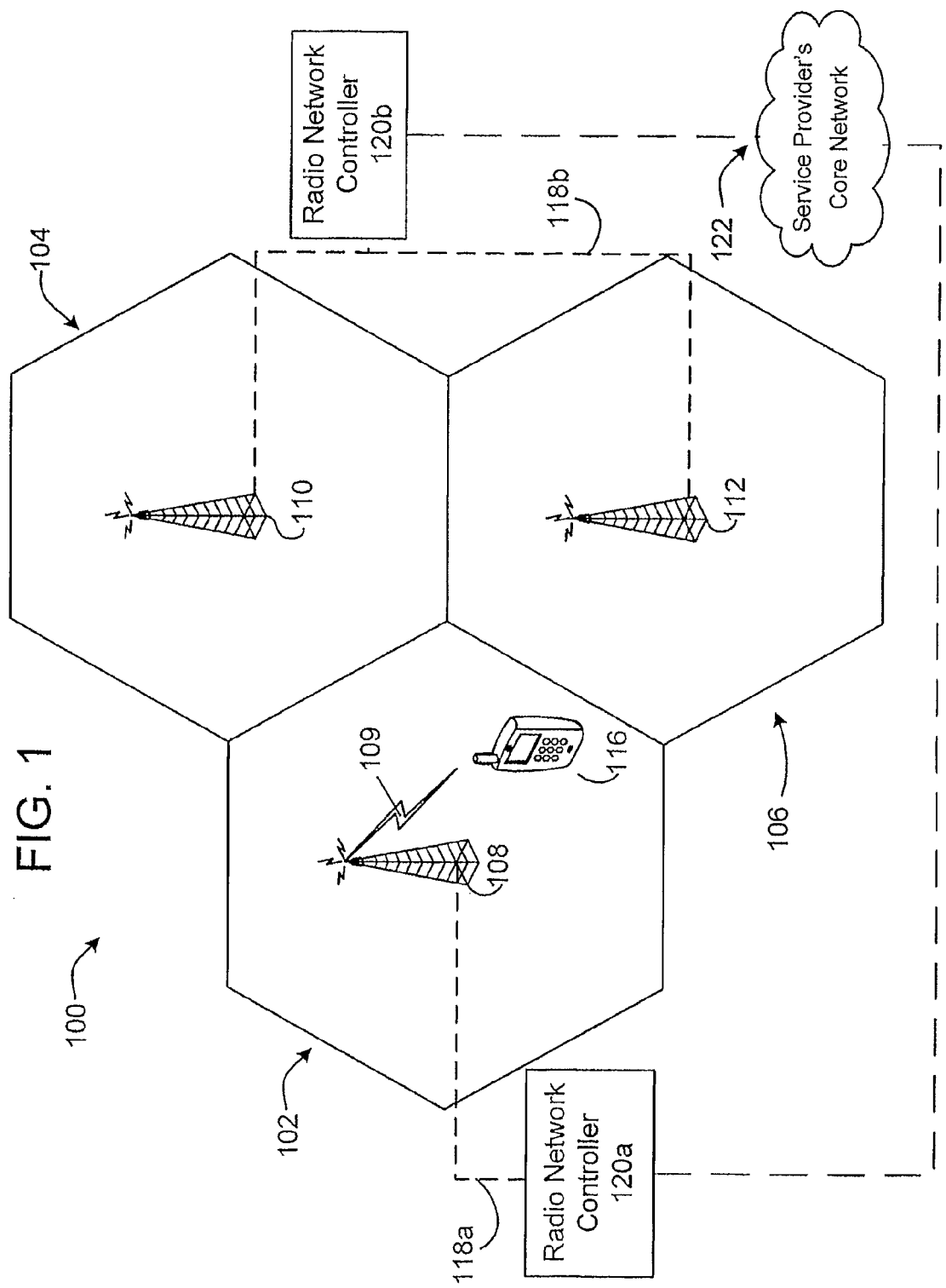
FIG. 1 is a diagram of a radio access network (RAN).

In wireless communication networks generally, the geographic areas served by access points, also referred to as "service areas," may vary in size, may include smaller service areas, and/or may be located within larger service areas. Larger geographic areas that include one or more smaller service areas are referred to as "macrocell areas," and an access point that serves a macrocell area is referred to as a "macrocell." Within a macrocell area, one or more access points may be located to serve smaller geographic areas, referred to as "femtocell areas." An access point that serves a femtocell area is referred to as a "femtocell access point." A macrocell, for example, may provide coverage to an area of a few blocks, while a femtocell access point may provide coverage to a an area covering the interior or vicinity of a vehicle, or spanning a floor of a building, a house, or an office space.

Global System for Mobile communications/Wideband Code Division Multiple Access (GSM/WCDMA) wireless communication networks (e.g., 2G/3G macro networks) have been implemented and are in operation globally. However, one motivation for providing "femtocell access points" in such 2G/3G macro networks is that the coverage of those macro networks is often poor which may cause, e.g., service disruption (e.g., a dropped telephone call) to users of User Equipment (UEs) at home and inside buildings. Femtocell access points, also known as, e.g., "home" base stations, private access points, or simply "femtocells", provide complementary indoor coverage to 2G/3G macro networks for service continuity. Femtocell access point (FAP) implementations may also serve as a new service platform to enable mobile wireless broadband applications and home entertainment.

A private access point may include, for example, a femtocell access point or a picocell access point. A private access point may be installed anywhere, for example, a vehicle, a home, an office, a public space, or a restaurant. For ease of description, private access points will be described hereinafter as femtocell access points or FAPs.

For communications between user equipments and access points generally, a call established between an access point and an user equipment may be transferred to another access point in a process referred to as a "handoff". From the point of view of a particular access point, there are two types of hand-offs: a "hand-out" moves an in-progress call out to a neighboring access point (allowing the access point to free up its resources) and a "hand-in" occurs when a neighboring access point transfers an in-progress call into the access point (the access point needs to allocate resources to service the call).

A handoff may be performed for a variety of different reasons. Typically, a handoff occurs when an user equipment moves into a different coverage area. For example, a call that has been established with a macrocell may be transferred to a neighboring macrocell when the user equipment moves outside of the service area covered by the macrocell. A handoff may also occur when the capacity for connecting new calls to a particular macrocell is reached. In this scenario, the macrocell may transfer an existing call (or a new call) to another macrocell with overlapping coverage.

Hand-offs between macrocells and femtocells may occur for similar/other reasons. A femtocell hand-in may occur when a user equipment determines that a neighboring femtocell can provide faster and/or more robust communications with the user equipment than can the macrocell. For example, the user equipment could be located in closer geographic proximity to the femtocell or there may be fewer obstructions in the communication path between the femtocell and the user equipment. Femtocell hand-in may occur whenever a femtocell signal is detected by the user equipment because it is operator policy to prefer femtocell usage over macrocell.

To facilitate a handoff, a user equipment identifies nearby macrocells or femtocells from information provided by the access point which is currently servicing the call. The information, collectively, is referred to as a "neighbor list" and includes scrambling codes assigned to neighboring macrocells and femtocells. The scrambling codes are used in WCDMA to separate transmissions from different access points sharing the same channel frequencies. A neighbor list may also include channel frequencies assigned to neighboring macrocells and femtocells.

In many hand-off processes, for example, a user equipment selects a scrambling code of a nearby access point from the neighbor list received from its current access point. The user equipment uses the scrambling code to decode a pilot signal that is continuously transmitted by the nearby access point in order to determine the quality of the communication channel between itself and that access point. For example, the user equipment can determine the signal-to-noise ratio, and the bandwidth of the communication channel. If the user equipment determines that the communication channel is of sufficient quality, it establishes communication with the nearby access point. Otherwise, the user equipment selects the scrambling code of a different access point from the neighbor list, tests the associated pilot signal, and repeats the process until a suitable access point is determined.

Referring to FIG. 1, a radio access network (RAN) 100 includes multiple macro access points or "macrocells" 108, 110, and 112 located in macrocell areas 102, 104, and 106, respectively. The macrocell areas 102, 104, and 106 can include one or more femtocell access points (FAPs). The macrocells 108, 110, and 112 are each configured to communicate with a user equipment over an airlink. For example, macrocell 108 communicates with user equipment (UE) 116 over an airlink 109. Macrocells 108, 110, and 112 are connected over a backhaul connection (e.g., backhaul connection 118a or 118b) to a radio network controller (RNC) which in turn communicates with the service provider's core network 122, e.g., via RNC 120a or 120b, which may be one or more physical devices at different locations.

The RAN 100 is configured to support various mobile wireless access technologies, examples of which include Universal Mobile Telecommunications System (UMTS) and Code Division Multiple Access (CDMA) 2000. The 1xEV-DO protocol has been standardized by the Telecommunication Industry Association (TIA) as TIA/EIA/IS-856, "CDMA2000 High Rate Packet Data Air Interface Specification," 3GPP2 C.S0024-0, Version 4.0, Oct. 25, 2002, which is incorporated herein by reference. Revision A to this specification has been published as TIA/EIA/IS-856A, "CDMA2000 High Rate Packet Data Air Interface Specification," 3GPP2 C.S0024-A, Version 2.0, July 2005. Revision A is also incorporated herein by reference. Revision B to this specification has been published as TIA/EIA/IS-856-B, 3GPP2 C.S0024-B and is also incorporated herein by reference. Other wireless communication standards may also be used. Although this description uses terminology from the 3GPP's UMTS standards, the same concepts are applicable to other wireless communication standards, including CDMA 1xEV-DO, CDMA2000, WiMax, WiBro, WiFi, and the like.

The following sections of the 3GPP Standard are hereby incorporated by reference in their entirety:

3GPP Technical Specification 25.331 version 8.3.0 Release 8, 2008-07, Universal Mobile Telecommunications System (UMTS); Radio Resource Control (RRC); Protocol specification;

3GPP Technical Specification 25.304 version 7.6.0 Release 7, 2008-07, Universal Mobile Telecommunications System (UMTS); User Equipment (UE) procedures in idle mode and procedures for cell reselection in connected mode;

3GPP Technical Specification 25.133 version 8.3.0 Release 8, 2008-06, Universal Mobile Telecommunications System (UMTS); Requirements for support of radio resource management (FDD);

3GPP Technical Specification 24.008 version 7.9.0 Release 7, 2007-10, Digital cellular telecommunications system (Phase 2+); Universal Mobile Telecommunications System (UMTS); Mobile radio interface Layer 3 specification; Core network protocols; Stage 3; and 3GPP Technical Specification 23.122 version 7.9.0 Release 7, 2007-06, Digital cellular telecommunications system (Phase 2+); Universal Mobile Telecommunications System (UMTS); Non-Access-Stratus (NAS) functions related to Mobile Station (MS) in idle mode.

Figure 2:
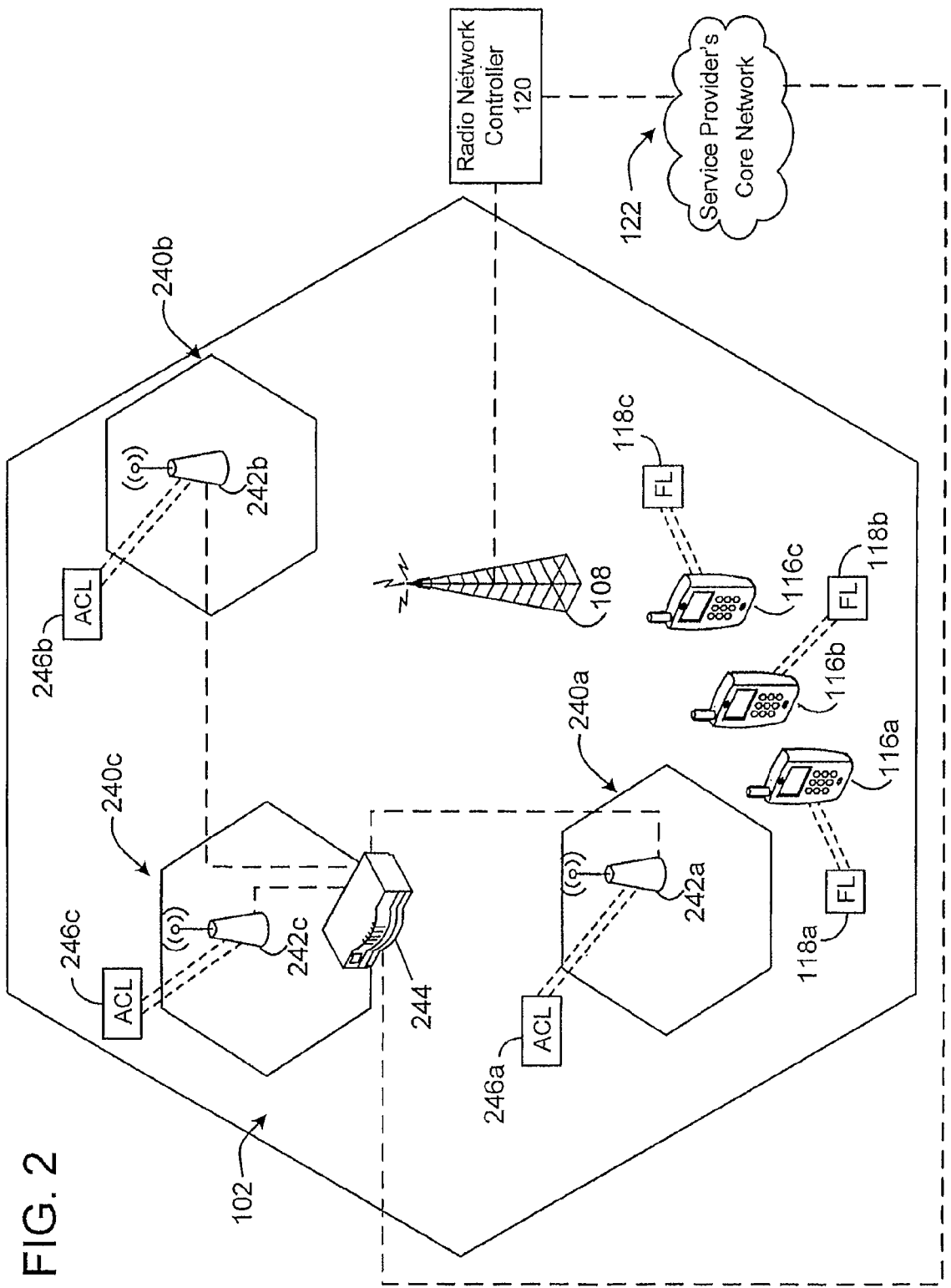
FIG. 2 is a diagram of a femtocell deployment within a macrocell area of the RAN of FIG. 1.

Referring to FIG. 2, it is diagram showing a femtocell deployment in the macrocell service area 102 of the RAN 100 of FIG. 1. The service area 102 of macrocell 108 includes femtocell areas 240a, 240b, and 240c served by femtocell access points (FAPs) 242a, 242b, and 242c, respectively. Hereinafter, the femtocell access points 242a, 242b, and 242c are referred to as "FAPs 242a, 242b, and 242c." Although, only three FAPs are shown in FIG. 2, in practice a macrocell area can include many more FAPs. For example, a macrocell area could include hundreds, thousands, or hundreds of thousands of FAPs.

A femtocell server 244 is in communication with one or more of the FAPs 242a-c. The femtocell server 244 maintains active associations between user equipments such as user equipments (UEs) 116a, 116b, and 116c and the FAPs 242a-c so that a hand-in request from the macrocell 108 (or other components of the mobile core network) can be directed to the correct FAP. One or more of the FAPs 242a-c and the femtocell server 244 may be combined as a single device. In early deployment, the femtocell server 244 may present a similar, conventional system interface as that of RNC 120 to the existing core network infrastructure 122. References to the core network 122 may in some cases be a shorthand for a reference to the femtocell server 244, and in some implementations, certain functions of the core network 122 may be included in the femtocell server 244 and vice versa. For example, when reference is made to an FAP accessing stored information from the core network 122, all or part of the information might be stored on the core network 122 and/or the femtocell server 244.

Each of the FAPs 242a-c is generally configured to continuously transmit or broadcast a main pilot signal. The main pilot for an FAP is decoded with a main scrambling code assigned to that particular FAP. The terms "main scrambling code" and "main pilot" may also be referred to as "operating scrambling code" and "operating pilot," respectively. The FAPs' main scrambling codes may be assigned with maximum geographic dispersal in order to minimize radio interference probability (given that they may be reused within a macrocell area in a dense deployment). The main scrambling codes assigned to the FAPs 242a-c may be stored in the neighbor list of the macrocell 108.

In some implementations, one or more FAPs may also be configured to transmit a second pilot signal concurrently with the main pilot. This second pilot signal is designated the "greeting pilot" ("GP"). Certain implementations of greeting pilots are described in more detail in U.S. patent application Ser. No. 11/960,026, entitled "Proximity Detection In A Network", filed Dec. 19, 2007, and hereby incorporated by reference in its entirety. In FAP implementations that include greeting pilots, the greeting pilot may be, for example, encoded/decoded using a scrambling code selected from, e.g., a set of "greeting scrambling codes". The greeting scrambling codes of the FAPs 242a-c may be populated in the neighbor list of the macrocell 108 instead of the main scrambling codes assigned to FAPs 242a-c. Thus, the main scrambling codes assigned to the FAPs 242a-c may generally be different from the set of greeting scrambling codes stored in the neighbor list of the macrocell 108. This may remove restrictions on the size of the available set of main scrambling codes for FAPs that may exist when greeting pilots are not implemented on particular FAP deployments. The set of greeting scrambling codes may be relatively small (e.g., between 1 and 4) compared to a total number of main scrambling codes assigned to the FAPs within a macrocell area. If different FAPs, or even all FAPs in an FAP deployment, share identical greeting scrambling codes for their greeting pilots, then the macrocell 108 may include as few as one greeting scrambling code in the macrocell's 108 neighbor list for the FAP deployment, which may reduce the number of required neighbor list entries on the neighbor list of the macrocell 108.

In FAP deployments that include greeting pilots, each single FAP may be referred to as including a "femtocell access point greeting pilot" ("FAP GP") and a "femtocell access point service cell" ("FAP service cell"; or "FAP SC"). Operation of FAP having an FAP GP and an FAP service cell is explained in more detail below and later with references to certain example implementations of closed access control techniques.

Although the main pilots of the FAPs 242a-c are generally always on, e.g., continuously transmitted while the FAPs 242a-c are in service, in FAP implementations that include greeting pilots, the greeting pilots of the FAPs 242a-c may be left on at all times, may turned on and off periodically, or may normally be turned off. AN FAP (e.g., FAP 242a) may turn on its greeting pilot when it wants to invite a user equipment that may be in the vicinity into its service area.

Furthermore, in FAP implementations having greeting pilots, the macrocell 108 may not announce the main scrambling codes of the FAPs 242a-c in its neighbor list. Accordingly, when the greeting pilot on an FAP is turned off, the FAP (e.g., FAP 242) may be "invisible" to a user equipment.

Femtocell access point systems typically perform some type of closed access control. Closed access control can mean the access to each femtocell access point is limited in some fashion (e.g., not every user equipment may "camp" on the femtocell and/or utilize the services of the femtocell). For example, an owner of an FAP may wish to control which user equipments are allowed to camp on and register with the core network 122 via the FAP to use normal service (e.g., non-emergency service).

User equipments may be "authorized" or "not authorized" ("unauthorized") to camp on and/or use services of an FAP. Each FAP of the FAPs 242a-c may include an authorization list, or "access control list," which may be stored in memory on the FAP (see, e.g., access control lists (ACLs) 246a, 246b, 246c stored on respective FAPs 242a, 242b, 242c in FIG. 2). The access control list for a particular FAP includes identities of UEs that are authorized on that FAP. Access control lists may be updated periodically by an administrator or operator of the core network (e.g., the core network 122). UEs that are not identified on the access control list of a particular FAP are not authorized on that FAP. A particular UE may be authorized on one FAP and unauthorized on another FAP. From the perspective of an FAP, an UE is either an authorized user equipment (AUE) or an unauthorized user equipment (UUE). From the perspective of an UE, an FAP is either an authorized FAP (e.g., a "home" FAP that the UE is authorized on), or an unauthorized FAP (e.g., a "foreign" FAP that the UE is not authorized on).

A home FAP may be located in a user's home, in an office building, or in some other public or private location. Likewise, a "foreign" FAP may be located in close physical proximity to a user's home FAP but still be foreign from the perspective of the UE. Just as an FAP may identify more than one authorized UE in its access control list, an UE may be authorized on more than one FAP (and thus may have more than one authorized FAP or home FAP). For ease of description, a home FAP for an user equipment will be referred to as though it is the only home FAP for the user equipment.

Since an access control list of an FAP may change from time to time, a particular UE may change from being an authorized UE (AUE) at one point in time to being an unauthorized UE (UUE) for that FAP. Similarly, from the perspective of the "changing" UE, what was once an authorized FAP (e.g., a "home" FAP) when the UE was an AUE for that FAP, becomes an unauthorized FAP (e.g., a "foreign" FAP") when the UE becomes a UUE for that same FAP.

In portions of the following description, the UE 116a is referred to as being an authorized UE on the FAP 242a, and the FAP 242a is referred to as being a home FAP for, or from the perspective of, the UE 116a. At the same time, the UE 116a is referred to as being an unauthorized UE with respect to the FAP 242b, and the FAP 242b is referred to as being a foreign FAP for, or from the perspective of, the UE 116a. In analogous fashion, the UE 116b is referred to as being an authorized UE on the FAP 242b and an unauthorized UE on the FAP 242a. References to UEs 116a-c as authorized UEs and/or unauthorized UEs and FAPs 242a-c as home FAPs and/or foreign FAPs are merely examples. Thus, in some examples, the FAPs 242a, 242b, and 242c may be home FAPs for one or more UEs and may simultaneously be foreign FAPs for one or more other UEs. The UEs 116a-c may be authorized UEs for one or more FAPs and may simultaneously be unauthorized UEs for one or more other FAPs.

Examples of UE identifiers that may be used in an access control list on a particular FAP may include the International Mobile Subscriber Identity (IMSI) of the UE. While the UE may also use a temporary identifier such as a Temporary Mobile Subscriber Identity (TMSI) in initial communications with an FAP, access control lists may generally include the unique IMSI of the UE rather than the TMSI.

In a wireless network such as a UMTS network, each access point is assigned an access point identifier such as a Location Area Identifier. Location Area Identifiers are explained in more detail in 3GPP Technical Specification 23.003, section 4.4.4.6. The Location Area Identifier (LAI) of the access point is broadcast to UEs. When camping on an access point, the UE issues a Location Area Update Request message that contains the LAI assigned to that access point. That Location Area Update Request message is forwarded by the access point to the core network and the core network returns a message to the UE that allows that UE to camp on the access point to use normal service (e.g., non-emergency service) or that rejects the UE's Location Area Update Request to disable normal service (unless the UE is trying to make an emergency call from the FAP). Once camped on an access point with a particular LAI, the UE can move into the coverage area of another access point with the same LAI without issuing a new Location Area Update Request. The UE issues a new Location Area Update Request message when the UE moves into the coverage area of an access point with a different LAI. The UE may also issue the Location Area Update Request periodically to inform an access point that the UE is still in the vicinity of the access point.

A LAI is an example of an access point identifier. In some examples, wireless networks that use other air interface standards may use an access point identifier other than a LAI in access control.

When an UE moves into the coverage area of an FAP, the UE will generally issue a Location Area Update Request message containing the LAI assigned to that FAP. Thus, even an UE that is unauthorized on a particular FAP but that is in range of or in the coverage area of the FAP will generally attempt to camp on the FAP and do Location Area registration with the core network (e.g., core network 122) using the Location Area Update Request message. In order to support a form of closed access control, Location Area Update Request messages from unauthorized UEs should be rejected to prevent the unauthorized UEs from camping on the FAP to use normal service. If Location Area Update requests from unauthorized UEs are not rejected by the FAP in some fashion, then unauthorized UEs that remain in range of the FAP will generally keep retrying the Location Area Update Requests, which drains the battery and shortens the battery life of the UEs. Other issues may arise when Location Area Update requests from unauthorized UEs are not properly rejected. In a situation in which an FAP is surrounded by unauthorized UEs, for example in a crowded area, the FAP may become overloaded in handling Location Area Update requests. If the FAP passes messages from UEs to the core network without first confirming that the UEs originating the messages are authorized on the FAP, then, due to the potential volume of requests from unauthorized UEs, excessive messaging traffic between the FAP and the core network may become an issue. On the other hand, it is possible for an FAP to reject an unauthorized UE completely, or effectively completely. However, since some core network operators consider it desirable for any UE, even an unauthorized UE, to make emergency calls using an FAP, such rejection methods that block unauthorized UEs from making even emergency calls may be undesirable.

In some examples, an UE in a UMTS network will generally include an access point identifier block list such as a "forbidden list" stored in the UE's internal memory (see, e.g., forbidden lists (FLs) 118a-118c stored on respective UEs 116a-c in FIG. 2). In the 3GPP Standard, an UE's forbidden list may be referred to as a "list of 'forbidden location areas for roaming'". The UE's forbidden list includes entries of access point LAIs. The forbidden list is often limited to a small number of entries, for example, around 10 LAI entries under the 3 GPP Standard, with the 3 GPP Standard setting a minimum of 10 LAI entries. Generally, if a LAI is on an UE's forbidden list, the UE will not send (or is blocked from sending) Location Area Update Request messages to access points that use that LAI for a significant period of time, for example, 24 hours. However, an UE is generally permitted to make emergency calls using an access points whose LAI is on the forbidden list. Access point LAI entries on an UE's forbidden list may be cleared in some of the following exemplary circumstances: when the time period (e.g., 24 hours) elapses, when the UE is turned off, when the UE's SIM card is removed, or when more LAIs than the capacity of the forbidden list are added to the forbidden list. Typically, adding a LAI to a full forbidden list purges the oldest LAI entry from the forbidden list.

Generally, when a Location Area Update Request message received from an UE is rejected by an access point proxying core network function or a core network communicating with the access point, the access point or core network may return a reject cause code to the UE. In a UMTS network, there are several reject cause codes of "permanent effect" that cause an UE to store the LAI (of the access point sending the reject cause code) in the UE's forbidden list. The UE is then blocked from sending Location Area Update Request messages to any access points using that stored LAI, until such time as the stored LAI is e.g., cleared from the forbidden list.

In general, there may be a limited pool of LAIs available to FAP network deployments. There is an upper limit of 65,536 different LAIs that may be used in a UMTS network. For other reasons (described below), a core network operator may restrict the pool of LAIs available to an FAP network even further. An UE may encounter many hundreds of FAPs as the UE is roaming around a densely populated area. If, for example, each FAP is assigned one LAI, then due to the limits on LAIs there will be at least some duplication of the LAIs assigned to different FAPs. There is a reasonable probability that an UE will roam near an unauthorized FAP (e.g., a "foreign FAP"; an FAP that the UE is not authorized to use) that has the same LAI with an authorized FAP for that UE (e.g., a "home" FAP; an FAP which the UE is authorized to use). If that unauthorized or foreign FAP with that LAI rejects the UE's Location Area Update Request message by using a reject cause code of permanent effect, then the identical LAI being used by the authorized or home FAP will be placed on the UE's forbidden list, and the UE will not be able to camp on the authorized FAP for normal service (e.g., non-emergency service). This presents challenges for a user returning to the vicinity of the user's authorized FAP since, in order to for the user's UE to use the authorized FAP, the user would generally be required to turn the UE on and off to clear the UE's forbidden list.

Figure 3:
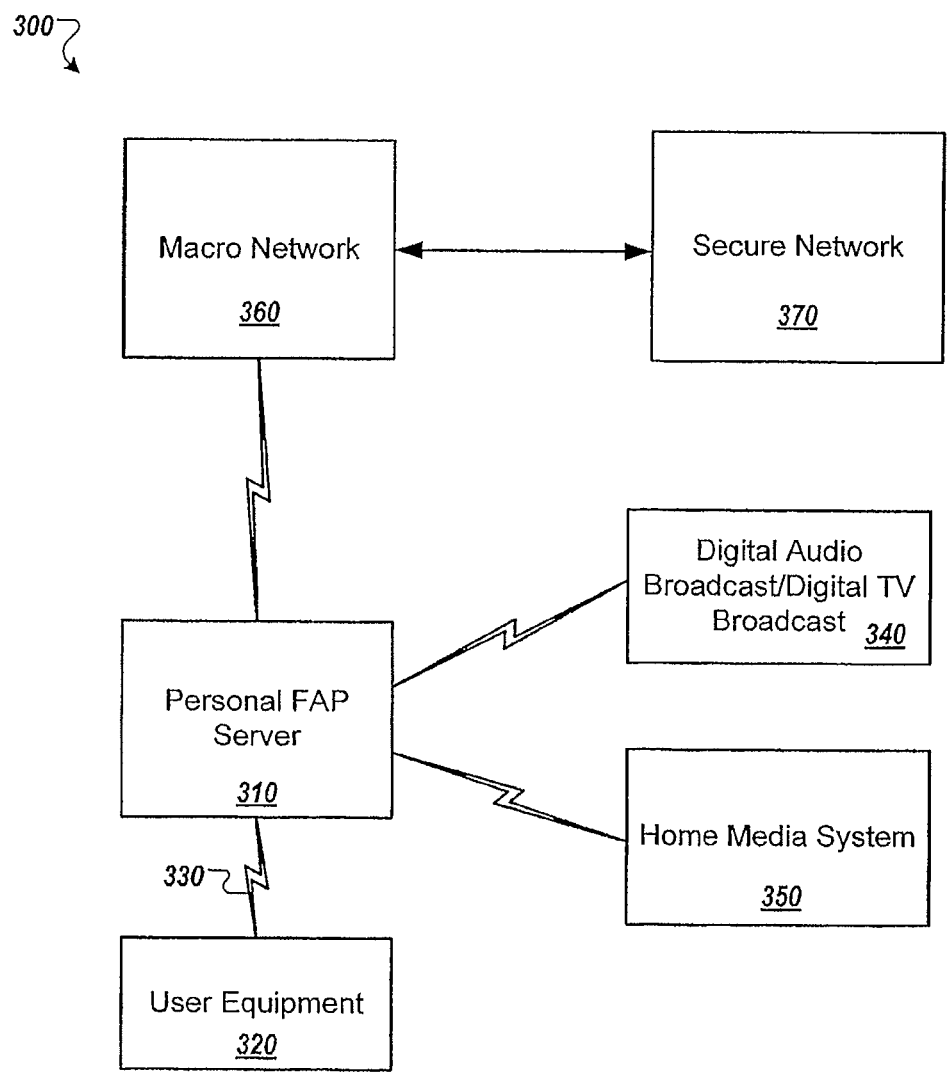
FIG. 3 shows an example media distribution system.

FIG. 3 shows an example media distribution system 300. In general, the media distribution system 300 stores media, such as audio, video, and/or other media content in a storage medium of a mobile base station, and transmits the stored media from the base station to a handheld device. For example, an automobile can be equipped with a media server that can transmit stored audio to a cell phone over a cellular communications link.

The media distribution system 300 includes a personal FAP server 310. The personal FAP server 310 is portable or mountable in a vehicle, and performs the functions of a femto access point as well as storing and distributing digital media to a user equipment 320. The user equipment 320 is communicatively connected to the personal FAP server 310 by a cellular communications link 330. Example embodiments of the user equipment 320 can include cellular telephones, personal digital assistants, pagers, and other types of wireless communication devices. Design characteristics (e.g., component size, power consumption, etc.) of the personal FAP server 310 can be selected for portability. As such, the personal FAP server 310 may act as a mobile base station and provide a smaller wireless coverage area (e.g., coverage to service to a single vehicle, a single residential home) than a fixed location cellular base station.

In addition to acting as a femto access point, the personal FAP server 310 is also able to receive, store, and transmit media content such as audio, video, data, code, or any other form of digital media. In some examples, the personal FAP server 310 is communicatively connected to a digital audio broadcast (DAB) and/or digital TV broadcast (DTV) receiver 340. The DAB/DTV receiver 340 can receive audio and video broadcasts, and can make those broadcasts available to the personal FAP server 310. For example, the DAB/DTV receiver 340 can be a digital video recorder that saves broadcast programs to a storage device. The personal FAP server 310 can communicate with the DAB/DTV receiver to obtain copies of stored programs, and store them for later access. Some examples of storage devices that can be used in association with the personal FAP server are provided in the description of FIG. 3

In some examples, the personal FAP server 310 can be communicatively connected to a home media system 350. The home media system 350 can be a media server, a theater PC, or other device that can store and provide digital media. For example, the home media server 350 can be a computer that stores a library of music files (e.g., MP3, WAV, WMA, OOG, RA), video files (e.g., MPEG, AVI, WMV, QT), image files (e.g. JPEG, GIF, TIFF, RAW, BMP), or other types of digital media. The personal FAP server 310 can communicate with the home media server to synchronize a collection of digital media files (e.g., a playlist, a folder of digital photos) to be stored by the personal FAP server 310 for later access.

In some examples, the personal FAP server 310 can communicate with the DAB/DTV receiver 340 and/or the home media system 350 in either a wired or a wireless manner. Examples of connections that can be used to communicatively connect the personal FAP server 310 to the DAB/DTV receiver 340 and/or the home media system 350 can include wired or wireless Ethernet, Bluetooth, infrared, ZigBee, serial (e.g., RS232, USB, RS422, SATA), parallel (e.g., Centronics, PATA, SCSI), or other communications formats that can be used to transfer digital media. In some examples, intermediary devices may be used. For example, a portable storage device (e.g., a USB thumb drive, a portable hard drive) can be used to transfer digital media between the DAB/DTV receiver 340, the home media server 350, and the personal FAP server 310.

The personal FAP server 310 is communicatively connected to a macro network 360. In some examples, the macro network 360 can be a cellular communications network. The macro network 360 is communicatively connected to a secure network 370. In some examples, the secure network 370 can provide authentication services for the personal FAP server 310 and/or the user equipment 320.

For example, the personal FAP server 310 can connect to the macro network 360 to request authentication from the secure network 370. Once authentication is granted, the user equipment 320 can communicate with the personal FAP server 310. Examples of communications among personal FAP servers, user equipment, media sources, and cellular network systems are discussed in the descriptions of FIGS. 3-5.

Figure 4:
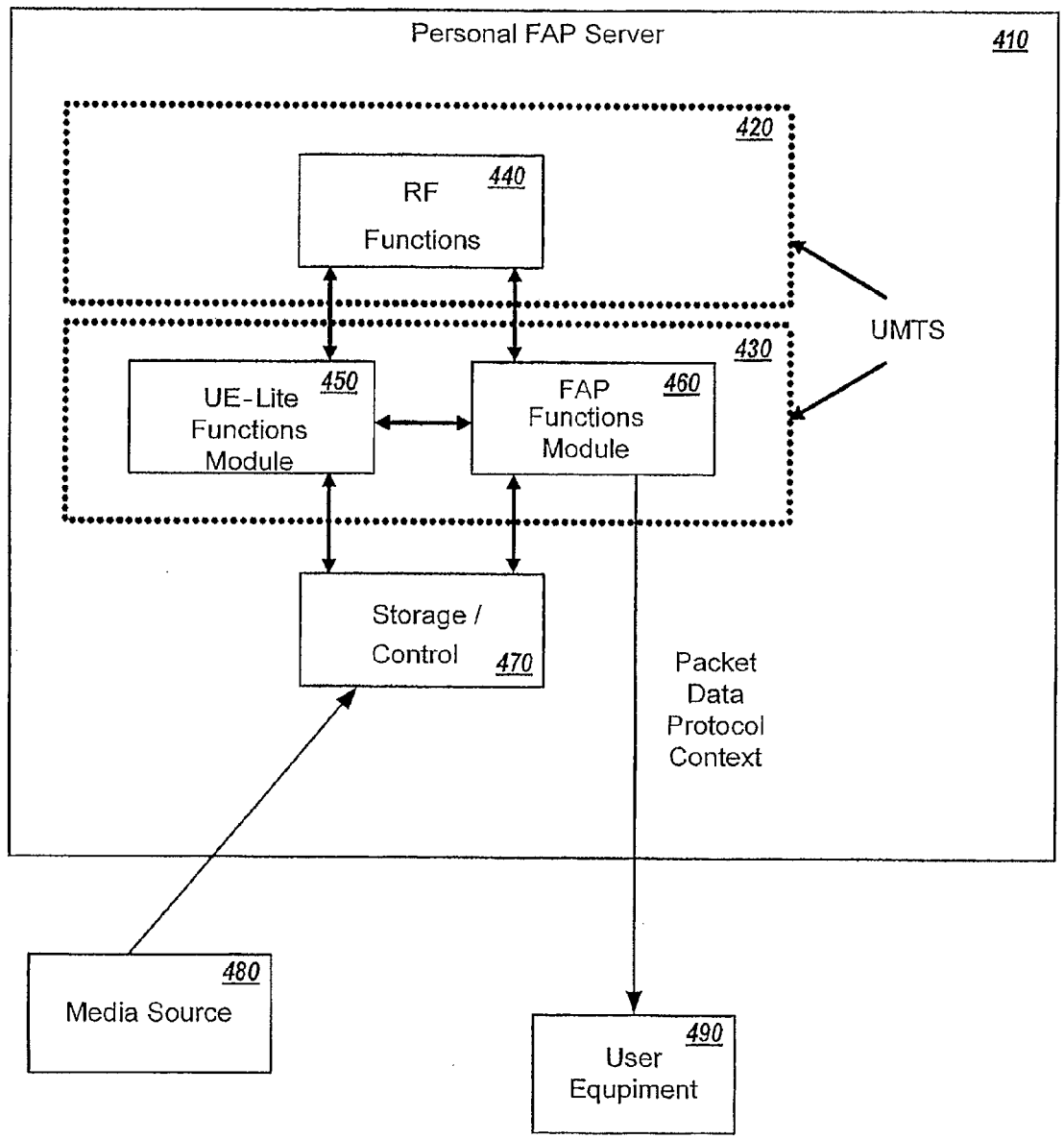
FIG. 4 shows an example personal femto access point (FAP) server.

FIG. 4 shows an example personal femto access point (FAP) server 410. In some examples, the personal FAP server 410 can be the personal FAP server 310 of FIG. 3. The personal FAP server 410 includes a radio 420 and a digital module 430. The radio module 420 includes an RF functions module 440. In some examples, the RF functions module 440 includes circuitry that can create a wireless (e.g., cellular) communications link with a communications network such as the macro network 360 of FIG. 3.

The digital module 430 includes a UE which may or may not have limited functionality, but which will be referred to as the UE-Lite functions module 450 and an FAP functions module 460. In some examples, the UE-Lite functions module 450 includes circuitry that can perform all or some of the functions of a user equipment (UE). For example, the UE-Lite functions module 450 can communicate with the RF functions module 440 to communicate with a macro network, such as the macro network 360. In some examples, by performing at least some of the functions of a UE, the UE-Lite functions module 450 can perform UE functions such as requesting authentication, transmit and/or receive audio, video, and/or data, exchange usage data, or perform other UE functions.

In some examples, the FAP functions module 460 includes circuitry that can perform the functions of a femto access point, such as the FAPs 242a, 242b, and 242c of FIG. 2. The UE-Lite functions module 450 and the FAP functions module 460 are communicatively connected to a storage and control module 470. In some examples, the storage and control module 470 can store digital media, such as digital audio, video, data, computer code, or other types of digital information. In some examples, the storage and control module 470 can be a mass storage device, such as a hard drive, non-volatile memory (NVRAM), or other type of device that can store digital information.

The storage and control module 470 can communicate with a media source 480. For example, the media source 480 can provide digital media such as digitally recorded video, audio, and/or other types of digital media to the personal FAP server 410 for storage in the storage and control module 470. In some examples, the media source 480 can be the DAB/DAV receiver 340 and/or the home media system 350 of FIG. 3.

In some examples, the FAP functions module 460 can communicate with a user equipment 490 through a packet data protocol context. For example, the user equipment 490 can be a cellular handset. The cellular handset can connect to the FAP functions module 460 through a cellular communications connection (e.g., UMTS, GSM, PCS, LTE, CDMA2000, EVDO), and the cellular handset can access the media stored by the storage and control module 470. A cellular handset can be used to play back audio and/or video recordings that were copied from the media source 480 to the personal FAP server 410.

In some examples, the radio module 420 can provide RF functions that enable the personal FAP server 410 to communicate with a macro network, a handheld device, or both. For example, the radio module 420 can be a single transceiver that communicates from both the personal FAP server 410 to a public data network (e.g., the macro network 360) and communications from the personal FAP server 410 to a UE (e.g., the UE 490). In some examples, the personal FAP server 410 can communicate with the macro network 360 and the UE 490 at different times. For example, the personal FAP server 410 can cease transmission during paging periods.

Figure 5:
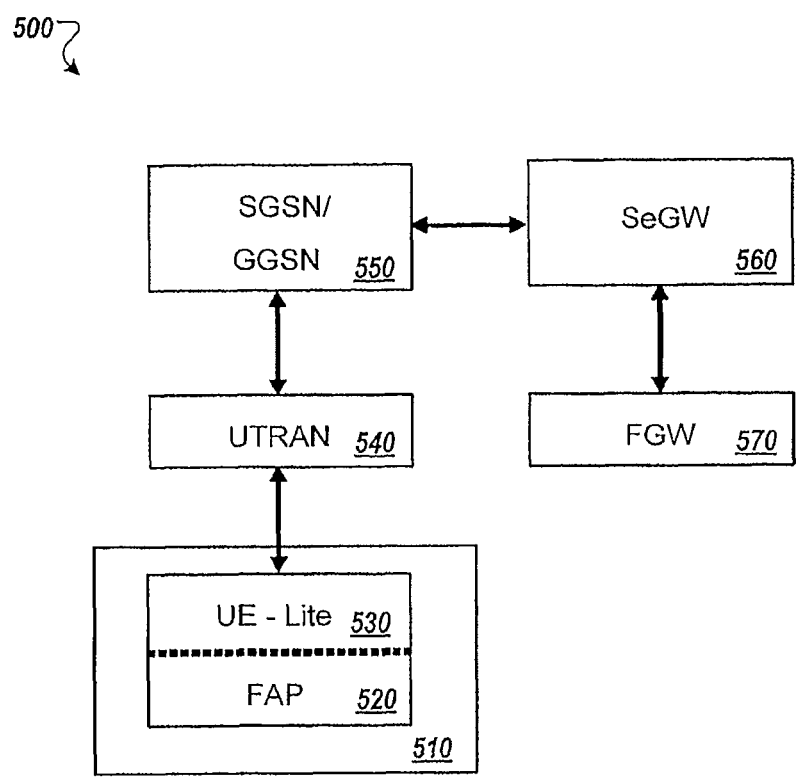
FIG. 5 is a block diagram of an example media distribution and back-end system.

FIG. 5 is a block diagram of an example media distribution and femto access system 500. The system 500 includes a personal FAP server 510. In some examples, the personal FAP server 510 can be the personal FAP server 310 of FIG. 3. The personal FAP server 510 includes an FAP module 520 and a UE-Lite module 530. In some examples, the FAP module 520 can be the FAP functions module 460 of FIG. 4. In some examples, the UE-Lite module can be the UE-Lite functions module 450.

The UE-Lite module 530 is communicatively connected to a UMTS terrestrial radio access network (UTRAN) 540. In some examples, the UTRAN 540 can be a collection of Node B's, radio network controllers, and other components that can make up a UMTS network that can carry packet switched and/or circuit switched communications traffic.

The UTRAN 540 is communicatively connected to a serving GPRS serving node and gateway GPRS serving node (SGSN/GGSN) 550. In some examples, the SGSN/GGSN 550 can provide applications connected to a UE (e.g., the UE-Lite 530) with a packet data connection. For example, the SGSN/GGSN 550 can provide the personal FAP server 510 access to a femto network through a packet data connection. In some examples, the UTRAN 540 can be the macro network 360 of FIG. 3.

The personal FAP server 510 communicates through the UTRAN 540 and the SGSN/GGSN 550 to communicate with a security gateway (SeGW) 560. In some examples, the personal FAP server 510 can communicate with the SeGW 560 to request authentication for the UMTS network.

The SeGW 560 is located before the FGW 570. The SeGW 560 protects the FGW 570 network by requiring that an IPSec tunnel is established between the FAP 520 and the SeGW 560. In some examples, the FAP 520 and the SeGW 560 can utilize security initiation protocols to establish these secure tunnels. Some examples of these protocols are the IKE and the IKEv2 protocols defined by IETF. To secure the tunnel, some form of secret information is required. In some examples, digital certificates (e.g., defined with public and private keys) and/or shared secrets such as those used in SIMs and USIMs.

As an example, the tunnel can be established using IKEv2, wherein the FAP 520 can send an IKE_"SA_INIT" message. The SeGW 560 can respond with an IKE_"SA_INIT" message that includes a request for a certificate in this example. The FAP 520 can start the authentication procedure to the network via the SeGW 560 by sending the IKE_"AUTH Request" to the SeGW 560. The FAP 520 can request a certificate from the SeGW 560 to authenticate itself. The FAP 520 can also send a "CFG_REQUEST" message to get an IP address assigned by the SeGW 560. The SeGW 560 can respond with the "AUTH" parameter, its certificate, its identity in the IDr, and "CFG_REPLY" parameters that can include the IP address of the UE, allocated by the SeGW 560. When completed, an authenticated IPSec tunnel can be created between the FAP 520 and the SeGW 560. In some examples, the SeGW 560 and the FGW 570 can be configured as different blades in the same chassis, such that once the link to the SeGW 570 is established, IP packets intended for the FGW 570 are sent via the FAP 520 through the tunnel to the SeGW 560. The SeGW 560 can extract the packets and pass them to the FGW 570 to which it is attached.

Figure 6:
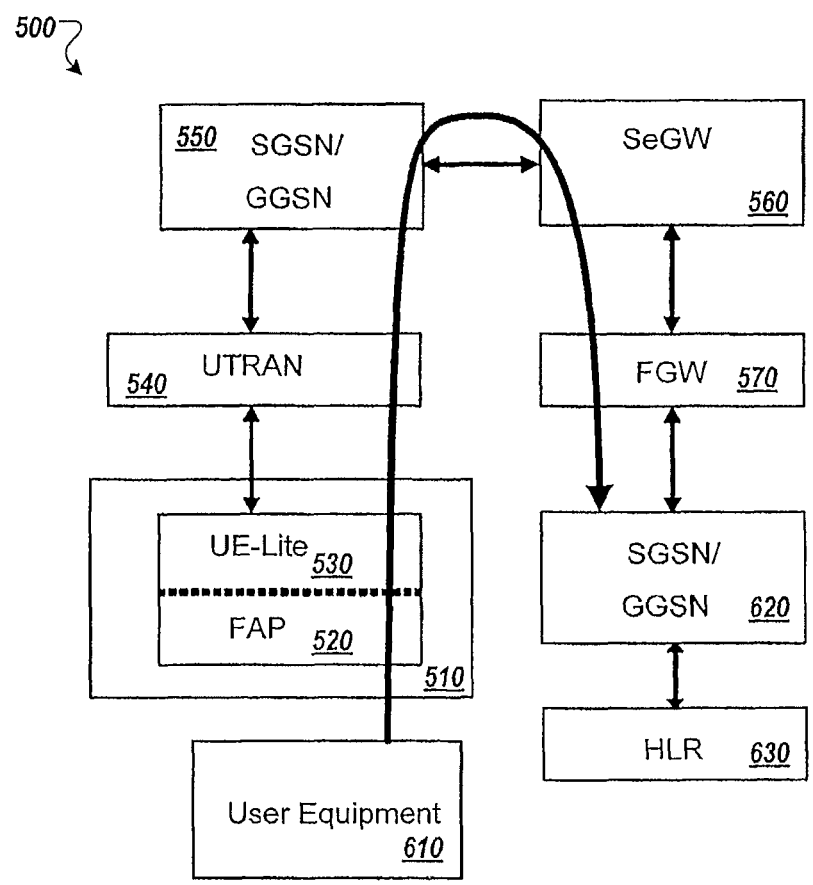
FIG. 6 is a block diagram of an example media distribution and back-end system that provides authentication of a user equipment.

FIG. 6 is a block diagram of the example media distribution and back-end system 500 that provides authentication of a user equipment 610. In some examples, there can be three stages in the process that will allow the UE 610 to access media content that is stored locally on the personal FAP server 510. In the first stage the UE-Lite 530 can register with the SGSN/GGSN 550 using the radio access services provided by the UTRAN 540. After the registration, the UE-Lite 530 can establish a PDP context that can terminate on the SGSN/GGSN 550. In some implementations, the SGSN and GGSN can be physically separate, but in this example we consider them as a single block to simplify the description.

With an active PDP context in place the second stage of the process can proceed. The FAP 520 can register and establish a secure tunnel to the SeGW 560, as considered previously. In the process of registering and establishing the secure tunnel, it is acknowledged that there may be details of discovery and registration that are well known by one skilled in the art, but which are not considered here. An example for such a procedure is defined by 3GPP in their FAP-SeGW/FGW procedures defined in TS25.467, TS25.468 and TS25.469. Once the connectivity between the FAP 520 and the FGW 570 is established, in the final stage the UE 610 can register and establish a PDP context with a SGSN/GGSN 620. In this example, the SGSN/GGSN 620 can negotiate the details of the PDP context such as services and data rates, and the endpoint of the PDP context can be arranged to be in the personal FAP server 510, rather than the SGSN/GGSN 550. In some examples, this type of arrangement can be referred to as "local break-out" or "local IP-access". Examples of how this may be achieved can include the SGSN/GGSN 620 supplying an IP address that has local significance at the personal FAP server 510. The personal FAP server 510 can intercept the network traffic and perform a NAT-like function by routing the user plane packet data locally within the FAP 520.

Some handsets have security features that prevent the handsets from working with a network unless the network grants them clearance to transmit. By granting a handset the correct security clearance, the handset can communicate with the personal FAP server 510. In other examples, cellular network operators may require that handsets and/or the personal FAP server 510 be authenticated in order to perform some form of billing, and need to record what forms of activity the handsets are involved in (e.g., times of day, day of week, connection duration, data volume).

The SeGW is communicatively connected to a home location register (HLR) 630. In some examples, the HLR 630 can be a central database that contains details about subscribers that are authorized to use the cellular network. For example, the HLR 630 can store details of subscriber identity module (SIM) cards issued by mobile phone operators. Each SIM has a unique identifier called an international mobile subscriber identity (IMSI) which is the primary key to each HLR 630 record. Other items of data associated with the SIM can be mobile subscriber integrated services digital network numbers (MSISDNs), which can be the telephone numbers used by mobile phones (e.g., the user equipment 320) to make and receive calls. The primary MSISDN can be the number used for making and receiving voice calls and short messaging system (SMS) messages, but it is possible for a SIM to have other secondary MSISDNs associated with it for fax and data calls. Each MSISDN can also be a primary key to the HLR 630 record.

Figure 7:
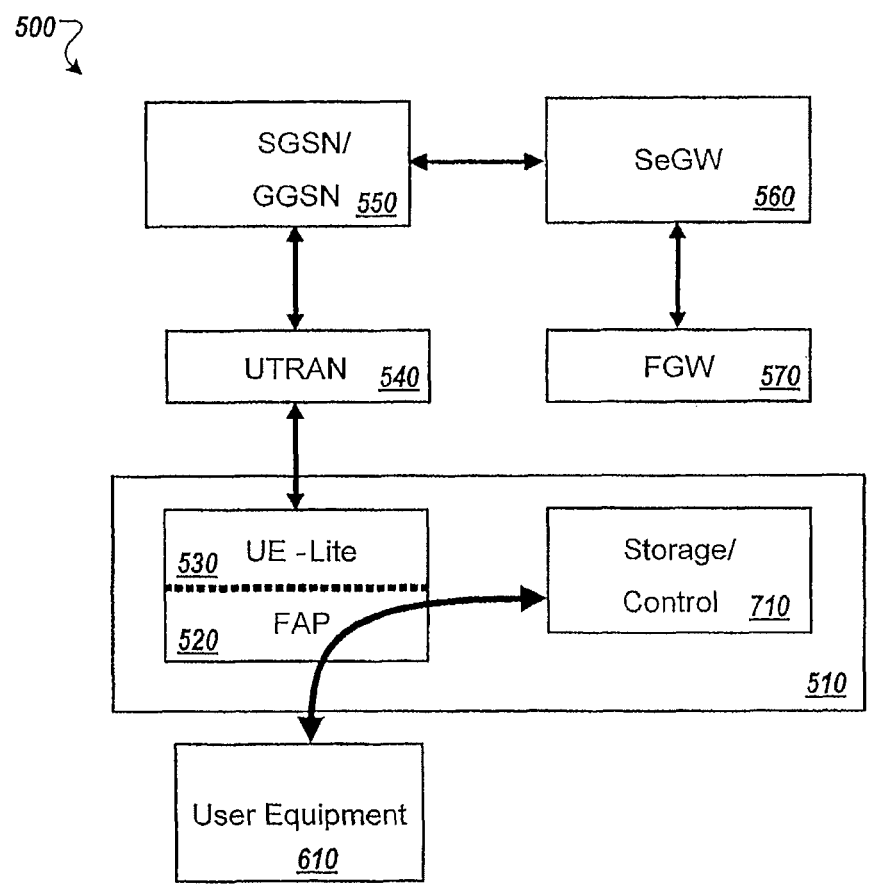
FIG. 7 is a block diagram of an example media distribution and back-end system that provides media from a personal FAP server to a user equipment.

FIG. 7 is a block diagram of an example media distribution and back-end system 500 that provides media from a personal FAP server 510 to a user equipment 610. Once the user equipment 610 is registered, it sets up a connection to the cellular network. In some examples, the user equipment 610 can establish a packet connection to the personal FAP server 510, but instead of connecting externally to the GGSN 620 as it normally would in the macro network (e.g., the macro network 360 of FIG. 3), the connection remains local to the personal FAP server 510 to connect to a storage and control module 710. In some examples, the storage and control module 710 can be the storage and control module 470 of FIG. 4.

In some examples, the user equipment 610 can connect to the storage and control module 710 to access media that is stored within. For example, the personal FAP server 510 can be mounted in a car. When the car is in the vicinity of a media source such as the media source 480, the personal FAP server 510 can synchronize and store audio, video, image, executable code, data, and/or other media from the media source 480. A user in the car can use a cellular telephone and a cellular communications link to access music and/or video content that is stored in the personal FAP server 510 mounted within the vehicle. In some examples, by accessing media stored by the storage and control module 710, the user can access media without needing to use cellular network bandwidth to download or stream the media. Additionally, the user can access the stored media using a cellular communications link that most handsets can be capable of establishing, rather than through a Bluetooth, WiFi, or other connection that may be less commonly found on cellular telephones.

In some examples, the personal FAP server 510 can adjust its communications behavior depending on its surrounding conditions. For example, the personal FAP server 510 can control the frame timing such that discontinuous reception (DRX) periods don't coincide with those of the user equipment 610 and/or the UTRAN 540. The personal FAP server 510 can cease transmission during paging periods from the FGW 570 (e.g., via the UTRAN 540) to the user equipment 610. In some examples, the paging message can be passed transparently to the FAP 520.

In some examples, when the paging period is over the FAP 520 can resume transmissions and pass the paging message to the UE 610 at the appropriate paging time. In some examples, the transfer of the paging information from the FGW 570 to the FAP 520 can to be controlled in such a way that the timing is well known and is in advance of the timing used for the paging to the UE 610.

After the paging request, as an example, if the UE 610 is being requested to establish a CS call connection, the FAP 520 can place the UE 610 onto the macro network 360 by forcing a handover. This handover could be either to a different frequency 3G cell, or to a 2G cell. In some examples, the call to the UE 610 can be carried via the FAP 520.

In some examples, the personal FAP server 510 can have a coverage area that is substantially localized, such as the interior of an automobile or other vehicle. For example, the personal FAP server 510 can include a directional antenna that is designed to transmit and receive signals to/from a handset located within or in the immediate vicinity of a vehicle. An example of such an antenna can have a link length of about a meter or less, with a path loss of about 40 dB, and an Ec/Ilo (1 Mbps DL) of approximately −3 dB. In some examples, an ultra low power receive signal of −105 dBm and transmit signal of −65 dBm can substantially reduce interference to the cellular network.

In some examples, the personal FAP server 510 can reduce its transmission rate and/or power, possibly to zero, when it passes close to a UMTS station. The personal FAP server 510 may also change the frequency with which it communicates with the user equipment 610 when the personal FAP server 510 remains positioned in the vicinity of a device having a predetermined broadcast strength for a predetermined length of time. For example, the personal FAP server 510 can switch frequencies, reduce its data rate, and/or reduce its transmission power if it is located near a cellular tower, a WiFi access point, a cordless phone, or other transmitter that can operate on substantially the same frequency as the personal FAP server 510.

Although exemplary embodiments have been described with reference to the figures, other implementations are possible. For example, the personal FAP server 510 can be implemented within a home to provide users with access to a central media collection from the residents' personal handsets. In other examples, the personal FAP server 510 can be implemented in a museum, shopping mall, airport, campus, hotel, resort, or other public space, to provide visitors with cell phone access to self-guided tour audio, multimedia supplements to physical displays, localized news and/or advertisements, or other media. In yet other examples, the personal FAP server can be located in a stadium, arena, track, golf course, or other location to provide players and/or spectators with cell phone access to video biographies of players, video flyby previews of golf links, streaming video from within race cars, streaming audio of pit crew radio communications, or other media.

Figure 8:
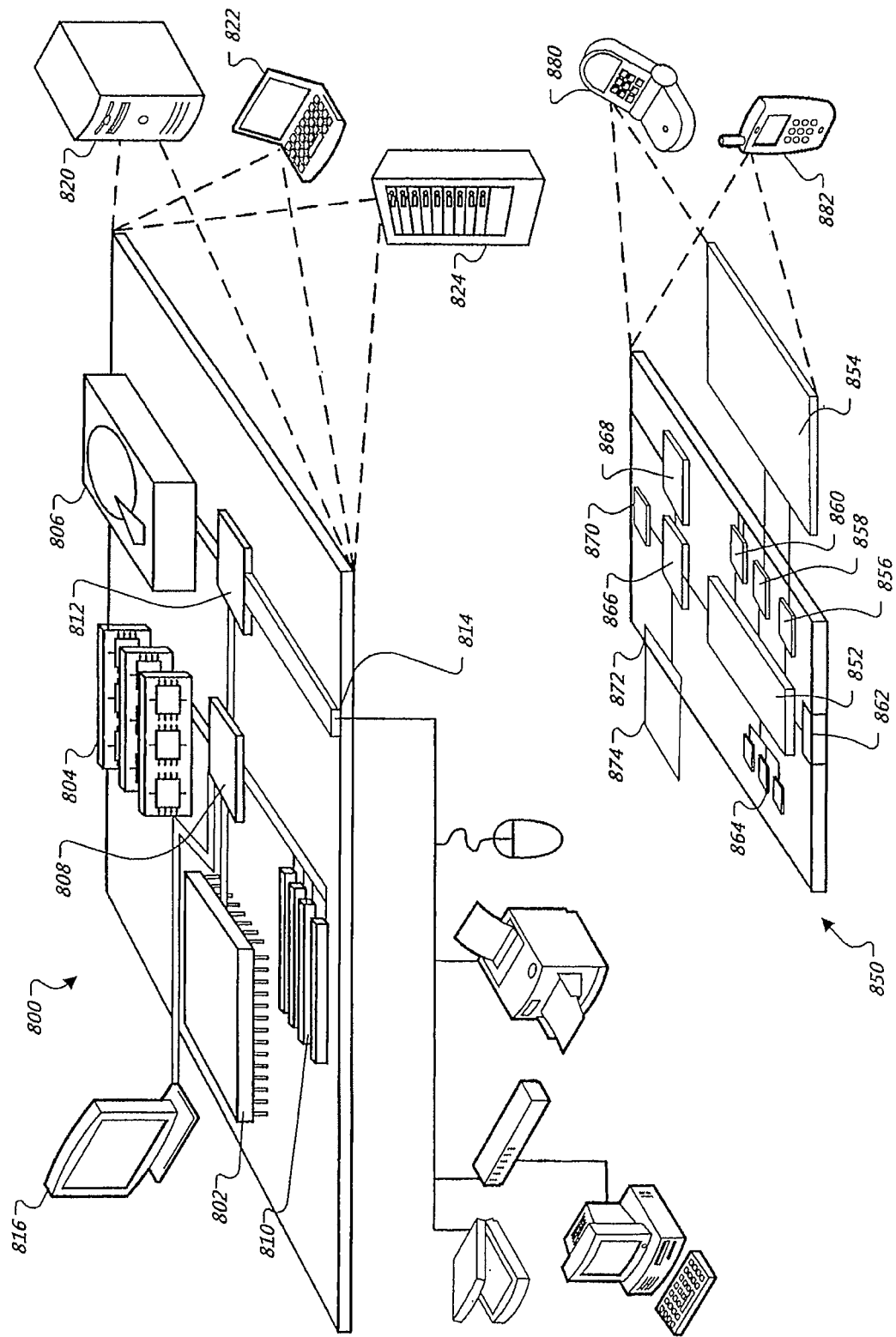
FIG. 8 is a block diagram of computing devices.

FIG. 8 is a block diagram of computing devices 800, 850 that may be used to implement the systems and methods described in this document, either as a client or as a server or plurality of servers. Computing device 800 is intended to represent various forms of digital computers, such as laptops, desktops, workstations, personal digital assistants, servers, blade servers, mainframes, and other appropriate computers. In some examples, the computing device 800 can be a device such as the FGW 570, the SGSN/GGSN 550, or the SeGW 560. Computing device 850 is intended to represent various forms of mobile devices, such as personal digital assistants, cellular telephones, smartphones, and other similar computing devices. For example, the computing device 850 can be a device such as the personal FAP server 510 or the user equipment 610. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a computer-readable medium. In one implementation, the memory 804 is a volatile memory unit or units. In another implementation, the memory 804 is a non-volatile memory unit or units.

The storage device 806 is capable of providing mass storage for the computing device 800. In one implementation, the storage device 806 is a computer-readable medium. In various different implementations, the storage device 806 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 804, the storage device 806, memory on processor 802, or a propagated signal.

The high speed controller 808 manages bandwidth-intensive operations for the computing device 800, while the low speed controller 812 manages lower bandwidth-intensive operations. Such allocation of duties is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can process instructions for execution within the computing device 850, including instructions stored in the memory 864. The processor may also include separate analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD display or an OLED display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, so as to enable near area communication of device 850 with other devices. External interface 862 may provide, for example, for wired communication (e.g., via a docking procedure) or for wireless communication (e.g., via Bluetooth or other such technologies).

The memory 864 stores information within the computing device 850. In one implementation, the memory 864 is a computer-readable medium. In one implementation, the memory 864 is a volatile memory unit or units. In another implementation, the memory 864 is a non-volatile memory unit or units. Expansion memory 874 may also be provided and connected to device 850 through expansion interface 872, which may include, for example, a SIMM card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, memory on processor 852, or a propagated signal.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS receiver module 870 may provide additional wireless data to device 850, which may be used as appropriate by applications running on device 850.

Device 850 may also communication audibly using audio codec 860, which may receive spoken information from a user and convert it to usable digital information. Audio codex 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smartphone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope. For example, advantageous results may be achieved if the steps of the disclosed techniques were performed in a different sequence, if components in the disclosed systems were combined in a different manner, or if the components were replaced or supplemented by other components. The functions and processes (including algorithms) may be performed in hardware, software, or a combination thereof, and some implementations may be performed on modules or hardware not identical to those described. Accordingly, other implementations are within the scope of the following claims.

What is claimed is:

1. A method comprising:
synchronizing a plurality of media files stored on a home media server with a femto access point, the femto access point configured to provide cellular services to at least one access terminal in a femto cell area;
storing the synchronized media files in a storage medium on a femto access point;
transmitting a stored media file of the stored media files from the femto access point to a handheld device through a cellular communication connection after authenticating the handheld device to access the cellular network; and
in response the handheld device receiving a call, forcing a handover the handheld device to a connection with the macro network;
wherein the plurality of media files comprises at least one from the group consisting of music files, video files, and image files.

2. The method of claim 1, wherein the femto access point establishes a first connection to a public data network, the first connection providing a data path for establishing a second connection between the femto access point and a secure network.

3. The method of claim 2, wherein the handheld device registers with the public data network via the femto access point and the secure network.

4. The method of claim 2, wherein communications from the femto access point to the public data network and communications from the femto access point to the handheld device are transmitted at different times.

5. The method of claim 4, wherein a single transceiver transmits communications from both the femto access point to the public data network and communications from the femto access point to the handheld device.

6. The method of claim 2, wherein transmissions from the secure network to the femto access point are controlled such that the femto access point receives the transmissions at a known time prior to a paging time for the handheld device.

7. The method of claim 1, wherein the femto access point ceases transmission of the stored media file to the handheld device during paging periods from the public data network.

8. The method of claim 1, wherein the femto access point reduces a rate of transmission of the stored media file to the handheld device if the femto access point is positioned less than a predetermined distance away from a device having a predetermined broadcast strength.

9. The method of claim 8, wherein the femto access point changes a frequency of transmission to the handheld device if the femto access point remains positioned less than a predetermined distance away from a device having a predetermined broadcast strength for a predetermined length of time.

10. The method of claim 1, wherein the femto access point is located on a vehicle.

11. The method of claim 1, further comprising storing a media file based on one or more of a WiFi, digital audio, and digital television broadcast.

12. A femto access point comprising:
a processor configured to synchronizing a plurality of media files stored on a home media server with a femto access point, the femto access point configured to provide cellular services to at least one access terminal in a femto cell area
a storage medium configured to store the synchronized media files; and a transmitter configured to transmit a stored media file of the stored media files to a handheld device through a cellular communications connection after authenticating the handheld device to access the cellular network;
wherein the plurality of media files comprises at least one from the group consisting of music files, video files, and image files; and
wherein in response the handheld device receiving a call, forcing a handover the handheld device to a connection with the macro network.

13. The femto access point of claim 12, wherein the femto access point establishes a first connection to a public data network, the first connection providing a data path for establishing a second connection between the femto access point and a secure network.

14. The femto access point of claim 13, wherein the handheld device registers with the public data network via the femto access point and the secure network.

15. The femto access point of claim 13, wherein communications from the femto access point to the public data network and communications from the femto access point to the handheld device are transmitted at different times.

16. The femto access point of claim 15, wherein a single transceiver transmits communications from both the femto access point to the public data network and communications from the femto access point to the handheld device.

17. The femto access point of claim 13, wherein transmissions from the secure network to the femto access point are controlled such that the femto access point receives the transmissions at a known time prior to a paging time for the handheld device.

18. The femto access point of claim 12, wherein the femto access point ceases transmission of the stored media file to the handheld device during paging periods from the public data network.

19. The femto access point of claim 12, wherein the femto access point reduces a rate of transmission of the stored media file to the handheld device if the femto access point is positioned less than a predetermined distance away from a device having a predetermined broadcast strength.

20. The femto access point of claim 19, wherein the femto access point changes a frequency of transmission to the handheld device if the femto access point remains positioned less than a predetermined distance away from a device having a predetermined broadcast strength for a predetermined length of time.

21. The femto access point of claim 12, wherein the femto access point is located on a vehicle.

22. The femto access point of claim 12, wherein the storage medium is configured to update the stored media file based on one or more of a WiFi, digital audio, and digital television broadcast.

23. A non-transitory computer readable medium storing instructions that, when executed by one or more processing devices, cause the one or more processing devices to perform operations comprising:
synchronizing a plurality of media files stored on a home media server with a femto access point, the femto access point configured to provide cellular services to at least one access terminal in a femto cell area;
storing the synchronized media files in a storage medium on a femto access point;
transmitting a stored media file of the stored media files from the femto access point to a handheld device through a cellular communication connection after authenticating the handheld device to access the cellular network; and
in response the handheld device receiving a call, forcing a handover the handheld device to a connection with the macro network;
wherein the plurality of media files comprises at least one from the group consisting of music files, video files, and image files.

24. The computer readable medium of claim 23, wherein the femto access point establishes a first connection to a public data network, the first connection providing a data path for establishing a second connection between the femto access point and a secure network.

25. The computer readable medium of claim 24, wherein the handheld device registers with the public data network via the femto access point and the secure network.

26. The computer readable medium of claim 24, wherein communications from the femto access point to the public data network and communications from the femto access point to the handheld device are transmitted at different times.

27. The computer readable medium of claim 26, wherein a single transceiver transmits communications from both the femto access point to the public data network and communications from the femto access point to the handheld device.

28. The computer readable medium of claim 24, wherein transmissions from the secure network to the femto access point are controlled such that the femto access point receives the transmissions at a known time prior to a paging time for the handheld device.

29. The computer readable medium of claim 23, wherein the femto access point ceases transmission of the stored media file to the handheld device during paging periods from the public data network.

30. The computer readable medium of claim 23, wherein the femto access point reduces a rate of transmission of the stored media file to the handheld device if the femto access point is positioned less than a predetermined distance away from a device having a predetermined broadcast strength.

31. The computer readable medium of claim 30, wherein the femto access point changes a frequency of transmission to the handheld device if the femto access point remains positioned less than a predetermined distance away from a device having a predetermined broadcast strength for a predetermined length of time.

32. The computer readable medium of claim 23, wherein the femto access point is located on a vehicle.

33. The computer readable medium of claim 23, wherein the synchronizing comprises updating the stored media file based on one or more of a WiFi, digital audio, and digital television broadcast.

* * * * *

UNITED STATES PATENT AND TRADEMARK OFFICE
CERTIFICATE OF CORRECTION

PATENT NO. : 9,078,284 B2  
APPLICATION NO. : 12/347574  
DATED : July 7, 2015  
INVENTOR(S) : Andrew Richardson Page 1 of 1

It is certified that error appears in the above-identified patent and that said Letters Patent is hereby corrected as shown below:

In the Claims

Column 18, Line 65, In Claim 12, delete "area" and insert -- area; --, therefor.

Signed and Sealed this
Twenty-first Day of June, 2016

Michelle K. Lee
*Director of the United States Patent and Trademark Office*